UNITED STATES PATENT OFFICE.

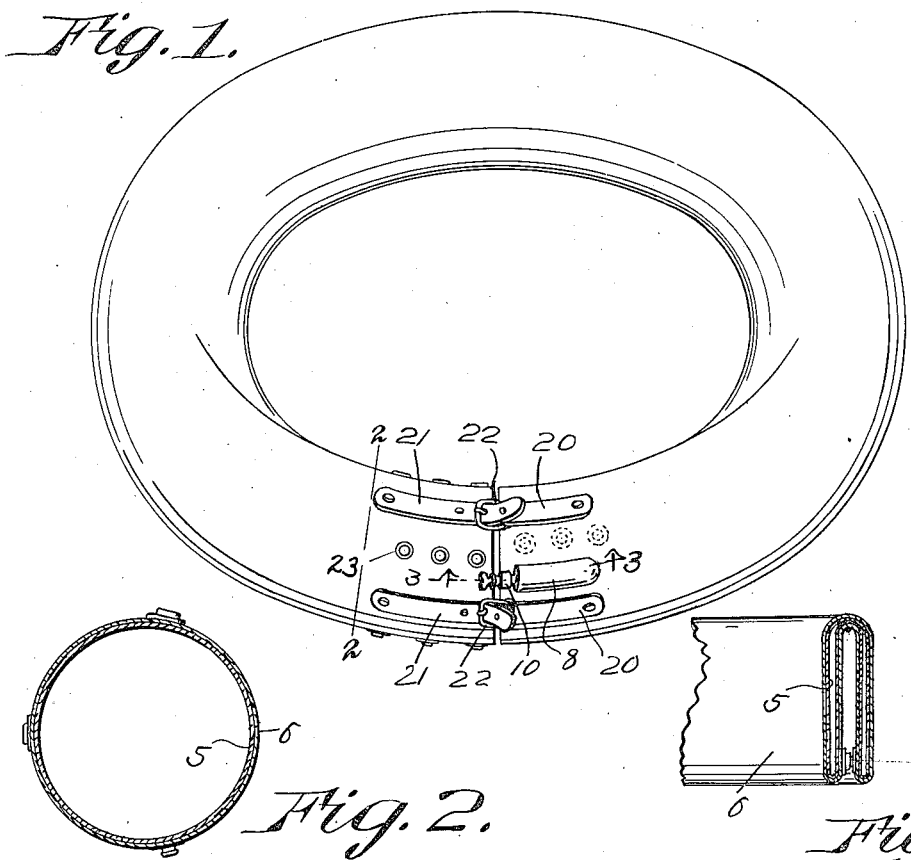
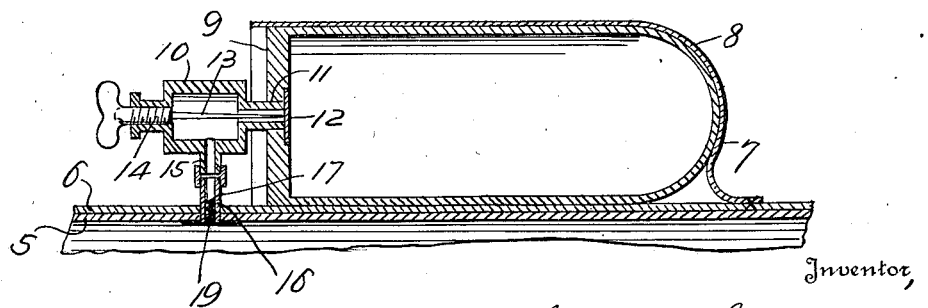

CARL O. CARLSON, OF MANOR, TEXAS.

LIFE-PRESERVER.

1,173,482.   Specification of Letters Patent.   Patented Feb. 29, 1916.

Application filed July 21, 1915. Serial No. 41,156.

*To all whom it may concern:*

Be it known that I, CARL O. CARLSON, a citizen of the United States of America, and resident of Manor, in the county of Travis and State of Texas, have invented certain new and useful Improvements in Life-Preservers, of which the following is a specification.

This invention relates to life preservers and has particular reference to means for inflating a life belt and the provision of a life belt which can be worn deflated and which will be automatically inflated without removing the belt from the wearer.

A further object of this invention is to provide an inflatable life belt which can be worn without discomfiture in its uninflated state, the same being provided with means for its inflation, the said means being carried by the life belt without discomfiture to the wearer, means being provided whereby the wearer may cause the inflation of the belt by simple mechanical means readily accessible and easily manipulated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in perspective of a belt embodying the invention; Fig. 2 illustrates a sectional view on the line 2—2 of Fig. 1; Fig. 3 illustrates a sectional view of a fragment of the belt on the line 3—3 of Fig. 1; and Fig. 4 illustrates a sectional view of the belt in a collapsed state.

In these drawings 5 denotes an inflatable rubber tube and 6 a fabric over which may be of silk or any textile material, 7 a pocket or casing attached to the cover in any appropriate way, the said pocket being designed for the reception of a compressed air tank 8, the head 9 of which is provided with a valve casing 10, the nipple 11 of which is secured in the head 9. The opening in the nipple 11 has its inner end closed by a plate 12 preferably of metal which will withstand the internal pressure of the tank 8 but of a character which will be readily punctured by the needle 13 which is formed as a part of a screw 14, which screw is threaded in the end of the valve casing 10 so that when the screw is turned the needle will be caused to travel through the plate 12 to form an orifice through which gas or compressed air within the tank may escape through the casing. The casing 10 has another nipple 15 communicating with the interior of the said casing and a check valve casing 16 which communicates with the interior of the life belt has a nipple 17 which is connected to the nipple 15 by a coupling 18 so that the compressed air or gas in the tank 8 may flow into the casing 10 and from said casing to the interior of the life belt upon puncture of the plate 12. There is a check valve 19 of ordinary construction within the valve casing 16 and therefore when the compressed air or gas flows from the tank 8 and the belt is inflated, the pressure within the life belt is maintained and equalizes the pressure within the tank.

As stated the belt may be readily inflated by manipulating the screw so as to puncture the plate, whereas when the belt is deflated, it can be worn folded as shown in Fig. 4, the folds being secured together by the fastenings 23, without inconvenience since the tank is comparatively small requiring but a limited capacity for inflating a particular belt.

The belt may be secured on a person by the straps 20 and 21, the former of which has a buckle 22 as fully shown. These straps may be duplicated to suit particular requirements.

While I have referred to the tank as adapted to contain compressed air or gas, it is immaterial what agency is employed for inflating the tube and such agency may be generally referred to as compressed air, meaning thereby any inflating agency.

I claim—

In a life preserver, an inflatable tube having a cover, a pocket on said cover, a compressed air tank in the said pocket, a coupling in communication with the air tank, a puncturable plate for controlling the escape of air from the tank to the coupling, a plate puncturing device extending through the coupling and adapted to operate on the said plate, means of communication between the said coupling and the said inflatable tube, and a check valve in the said means of communication.

In testimony whereof, I hereunto affix my signature in the presence of two witnesses.

CARL O. CARLSON.

Witnesses:
W. G. CROCKETT,
WM. LUEDECKE.